(12) United States Patent
Frost et al.

(10) Patent No.: US 12,055,430 B2
(45) Date of Patent: Aug. 6, 2024

(54) FLUID LEVEL SENSOR FOR A TOROID-SHAPED TANK

(71) Applicant: HONEYWELL INTERNATIONAL INC., Charlotte, NC (US)

(72) Inventors: Cristopher Frost, Phoenix, AZ (US); Jennifer Battista, Phoenix, AZ (US); Christopher Zollars, Phoenix, AZ (US); Eric Bridges, Phoenix, AZ (US); Carlos Enrique Murrieta, Mexicali (MX); Victor Cabilan, Phoenix, AZ (US); Jason Vizcaino, Phoenix, AZ (US); Patrick Flynn, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/057,410

(22) Filed: Nov. 21, 2022

(65) Prior Publication Data
US 2024/0167866 A1 May 23, 2024

(51) Int. Cl.
*G01F 23/34* (2006.01)
*G01F 23/76* (2006.01)

(52) U.S. Cl.
CPC .............. *G01F 23/34* (2013.01); *G01F 23/76* (2013.01)

(58) Field of Classification Search
CPC ........... G01F 23/34; G01F 23/76; G01F 23/32
USPC ............................... 73/114.56, 313, 314, 317
See application file for complete search history.

(56) References Cited

U.S. PATENT DOCUMENTS

| | | | |
|---|---|---|---|
| 4,107,494 A | 8/1978 | Tuegel | |
| 4,590,798 A | 5/1986 | Yazaki | |
| 8,674,685 B2 | 3/2014 | Paradise | |
| 9,086,314 B2 | 7/2015 | Czarnek | |
| 9,664,553 B1 | 5/2017 | Smith | |
| 10,830,628 B2 | 11/2020 | Cleyet et al. | |
| 11,422,021 B2 | 8/2022 | Gebhard et al. | |
| 2004/0149032 A1 | 8/2004 | Sell | |
| 2018/0156066 A1 | 6/2018 | Chalaud et al. | |
| 2018/0156654 A1 | 6/2018 | Roux | |
| 2020/0217219 A1 | 7/2020 | Cortequisse | |
| 2021/0156726 A1 | 5/2021 | Gebhard et al. | |

FOREIGN PATENT DOCUMENTS

| | | |
|---|---|---|
| DE | 19836597 A1 | 2/2000 |
| DE | 102011002038 B3 | 3/2012 |
| EP | 3892833 A1 | 10/2021 |

*Primary Examiner* — Robert R Raevis
(74) *Attorney, Agent, or Firm* — Lorenz & Kopf LLP (57) ABSTRACT

A fluid level sensor for sensing a level of a fluid within a toroid-shaped tank includes a float ring, a float structure, a gauge shaft, and a tiller arm. The float ring rotate s within the toroid-shaped tank about a first rotational axis. The float structure exhibits buoyancy in the fluid disposed within the toroid-shaped tank and supplies a force to the float ring based on the level of the fluid within the toroid-shaped tank. The gauge shaft is mounted for rotation about a second rotational axis and rotates about the second rotational axis to a position representative of the level of the fluid within the toroid-shaped tank. The tiller arm supplies the rotational drive force to the gauge shaft when the float ring rotates.

20 Claims, 5 Drawing Sheets

FLUID LEVEL SENSOR FOR A TOROID-SHAPED TANK

TECHNICAL FIELD

The present invention generally relates to fluid level sensing, and more particularly relates to a fluid level sensor for sensing fluid level in a toroid-shaped tank.

BACKGROUND

Gas turbine engines are used in myriad environments for myriad uses. For example, many aircraft, including both fixed-wing and rotary aircraft, include gas turbine engines to function as the main propulsion engines. The main propulsion engines, in many aircraft, not only provide propulsion for the aircraft, but may also be used to drive various other rotating components such as, for example, generators, compressors, and pumps, to thereby supply electrical and/or pneumatic power.

No matter its specific end-use environment or function, a gas turbine engine needs to be supplied with lubrication. The source of lubrication is typically a lubricant tank that is disposed on or within the gas turbine engine. Recently, there has been a move to design the lubricant tank to be mounted within the inlet structure of the gas turbine engine. In particular, there has been a push to mount a toroid-shaped tank within the flow path center body of the inlet structure, thereby saving weight and space.

Although mounting a toroid-shaped lubricant tank within a gas turbine engine inlet structure does save weight and space, it also presents certain challenges. For example, it is desirable to be able to measure the fluid level (e.g., lubricant level) within the toroid-shaped tank without having to dispose relatively complex and/or costly electronics on or within the tank.

Hence, there is a need for a level sensor that can measure the fluid level within a toroid-shaped tank without having to dispose relatively complex and/or costly electronics on or within the tank. The present disclosure addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a fluid level sensor for sensing a level of a fluid within a toroid-shaped tank includes a float ring, a float structure, a gauge shaft, and a tiller arm. The float ring is adapted to be mounted within the toroid-shaped tank and is configured to rotate within the toroid-shaped tank about a first rotational axis. The float structure is coupled to the float ring and is configured to exhibit buoyancy in the fluid disposed within the toroid-shaped tank. The float structure supplies a force to the float ring based on the level of the fluid within the toroid-shaped tank, thereby causing the float ring to rotate. The gauge shaft is spaced-apart from the float ring and is mounted for rotation about a second rotational axis. The gauge shaft is coupled to receive a rotational drive force and is configured, upon receipt of the rotational drive force, to rotate about the second rotational axis to a position representative of the level of the fluid within the toroid-shaped tank. The tiller arm has a first end and a second end. The first end is coupled to the gauge shaft, and the second end extends through, and is axially movable relative to, the float ring. The tiller arm is configured to supply the rotational drive force to the gauge shaft when the float ring rotates.

In another embodiment, an engine inlet assembly for a gas turbine engine includes an inlet structure, a toroidal-shaped lubricant tank, and a fluid level sensor. The inlet structure is symmetrically formed about a first rotational axis and is adapted to be coupled to a gas turbine engine. The toroid-shaped lubricant tank is mounted within the inlet structure and is symmetrically disposed about the first rotational axis. The fluid level sensor is configured to sense a level of lubricant within the toroid-shaped tank and includes a float ring, a float structure, a gauge shaft, and a tiller arm. The float ring is adapted to be mounted within the toroid-shaped tank and is configured to rotate within the toroid-shaped tank about a first rotational axis. The float structure is coupled to the float ring and is configured to exhibit buoyancy in the lubricant disposed within the toroid-shaped tank. The float structure supplies a force to the float ring based on the level of the lubricant within the toroid-shaped tank, thereby causing the float ring to rotate. The gauge shaft is spaced-apart from the float ring and is mounted for rotation about a second rotational axis. The gauge shaft is coupled to receive a rotational drive force and is configured, upon receipt of the rotational drive force, to rotate about the second rotational axis to a position representative of the level of the lubricant within the toroid-shaped tank. The tiller arm has a first end and a second end. The first end is coupled to the gauge shaft, and the second end extends through, and is axially movable relative to, the float ring. The tiller arm is configured to supply the rotational drive force to the gauge shaft when the float ring rotates.

In yet another embodiment, a gas turbine engine assembly includes a housing, a compressor, a combustor, and a turbine disposed within the housing, an inlet structure, a toroid-shaped lubricant tank, and a fluid level sensor. The turbine and compressor are mounted to rotate about a first rotational axis. The inlet structure is coupled to the housing upstream of the compressor and is symmetrically disposed about the first rotational axis. The toroid-shaped lubricant tank is mounted within the inlet structure and is symmetrically disposed about the first rotational axis. The fluid level sensor is configured to sense a level of lubricant within the toroid-shaped tank and includes a float ring, a float structure, a gauge shaft, and a tiller arm. The float ring is adapted to be mounted within the toroid-shaped tank and is configured to rotate within the toroid-shaped tank about a first rotational axis. The float structure is coupled to the float ring and is configured to exhibit buoyancy in the lubricant disposed within the toroid-shaped tank. The float structure supplies a force to the float ring based on the level of the lubricant within the toroid-shaped tank, thereby causing the float ring to rotate. The gauge shaft is spaced-apart from the float ring and is mounted for rotation about a second rotational axis. The gauge shaft is coupled to receive a rotational drive force and is configured, upon receipt of the rotational drive force, to rotate about the second rotational axis to a position representative of the level of the lubricant within the toroid-shaped tank. The tiller arm has a first end and a second end. The first end is coupled to the gauge shaft, and the second end extends through, and is axially movable relative to, the float ring. The tiller arm is configured to supply the rotational drive force to the gauge shaft when the float ring rotates.

Furthermore, other desirable features and characteristics of the fluid level sensor will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

With the above in mind, although the fluid level sensor and toroid-shaped tank are described herein as being implemented in a gas turbine engine, and more specifically, in a gas turbine engine configured as a helicopter turboshaft propulsion engine, the fluid level sensor may be used to sense the fluid level in a toroid-shaped tank that is implemented in any one of numerous other machines or environments.

Figure 1:
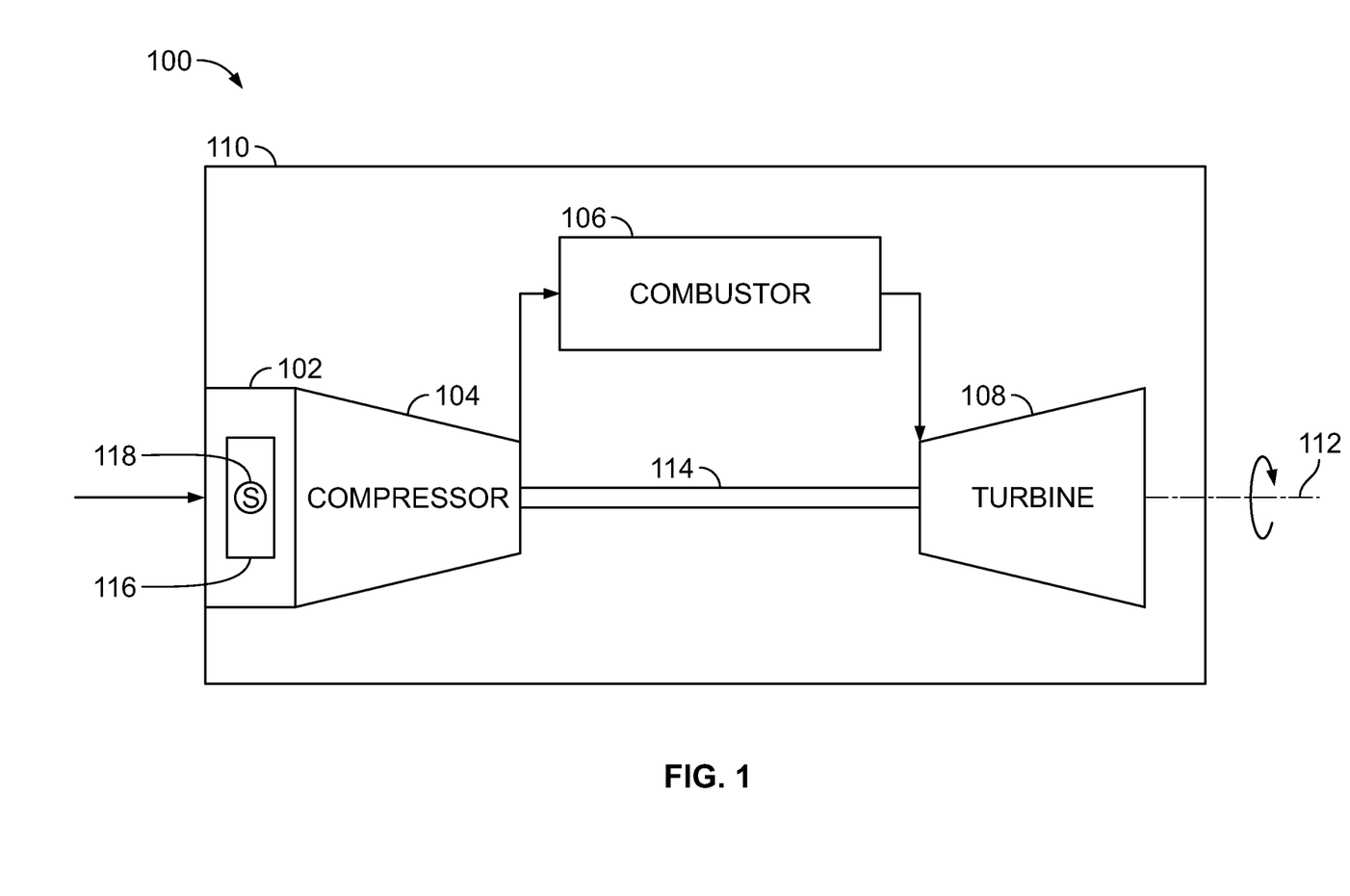
FIG. 1 depicts a schematic representation of one embodiment of a gas turbine engine.

Turning now to FIG. 1, a schematic representation of one embodiment of a gas turbine engine, and more specifically a helicopter turboshaft propulsion engine 100 is depicted. The depicted engine 100 includes at least an inlet structure 102, a compressor 104, a combustor 106, and a turbine 108, all disposed within or mounted on a housing 110. The inlet structure 102 is coupled to the housing 110 and is disposed upstream of the compressor 104. During operation, the compressor 104, which is rotationally mounted within the housing 110, draws in ambient air through the inlet structure 102, compresses the air, and supplies the compressed air to the combustor 106. It will be appreciated that the compressor 104 may be implemented using any one of numerous types of compressors. For example, the compressor 104 may be a single-stage or multi-stage centrifugal and/or axial compressor system.

The combustor 106 receives the compressed air from the compressor 104, and also receives a flow of fuel from a non-illustrated fuel source. The fuel and compressed air are mixed within the combustor 106 and are ignited to produce relatively high-energy combustion gas. The combustor 106 may be implemented as any one of numerous types of combustors, including can-type combustors, reverse-flow combustors, through-flow combustors, and slinger combustors.

The relatively high-energy combustion gas that is generated in the combustor 106 is supplied to the turbine 108. The turbine 108 is rotationally mounted within the housing 110. Thus, as the high-energy combustion gas expands through the turbine 108, it impinges on the turbine blades, which causes the turbine 108 to rotate about a rotational axis 112. It will be appreciated that the turbine 108 may be implemented using any one of numerous types of turbines. The turbine 108 includes an output shaft 114 that drives the compressor 104 to also rotate about the rotational axis 112.

The engine 100 depicted in FIG. 1 also includes a lubrication system, which is configured to supply lubricant, such as oil, to various components within the APU 100. The lubrication system includes various components which are not depicted in FIG. 1. One of the components that is depicted, however, is a lubricant tank 116. The lubricant tank 116, which is toroid-shaped, is mounted within the inlet structure 102 and is used to store lubricant. The inlet structure 102 and the toroid-shaped lubricant tank 116 are both symmetrically disposed about the first rotational axis 112. Although the inlet structure 102 and toroid-shaped tank 116 may be variously configured and implemented, one particular embodiment of the inlet structure 102 and one particular embodiment of the toroid-shaped tank 116 shown coupled to the inlet structure 102 are depicted in FIG. 2.

Figure 2:
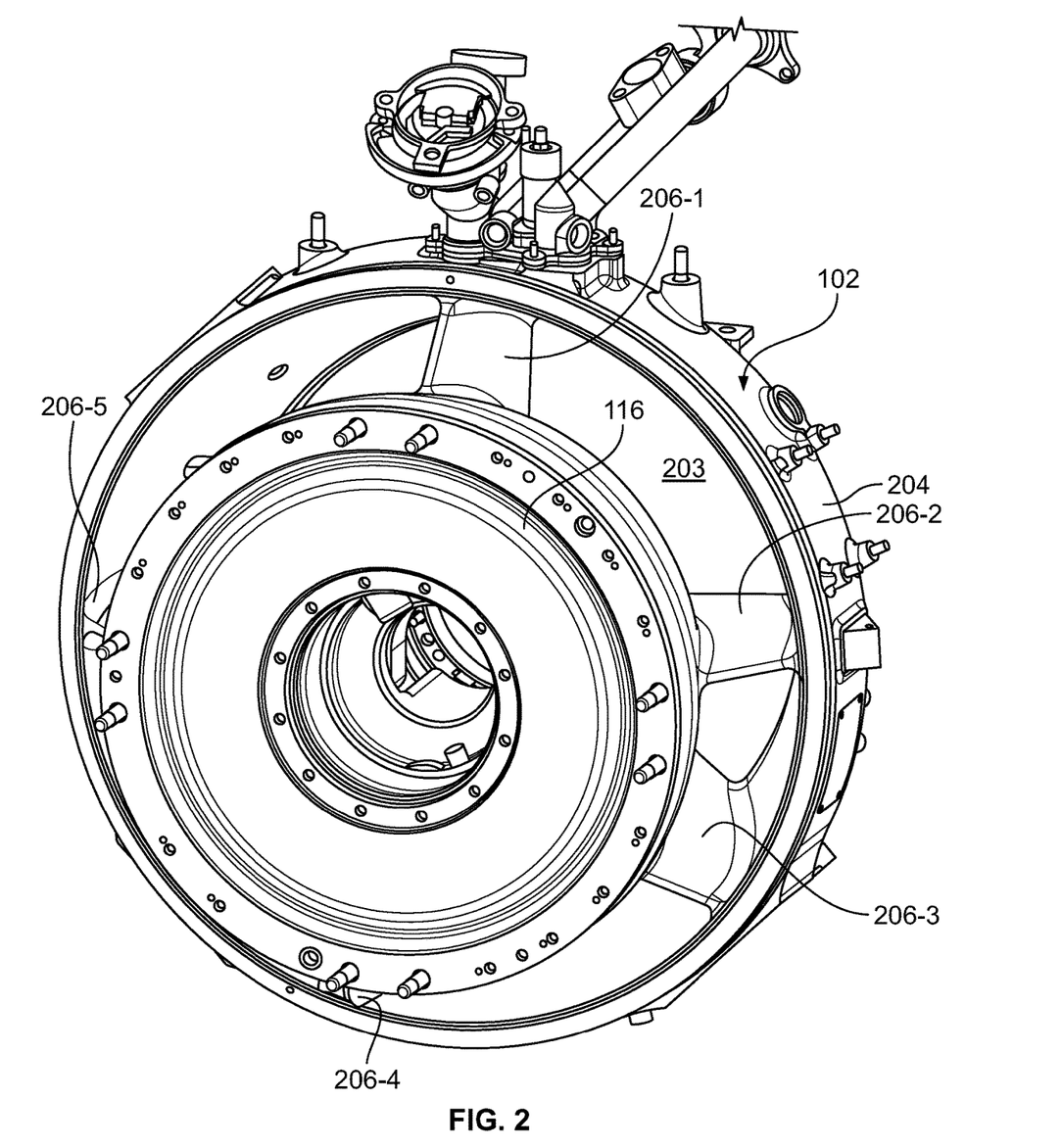
FIG. 2 depicts one particular embodiment of a toroid-shaped tank coupled to an inlet structure that may be installed in the gas turbine engine of FIG. 1.

As FIG. 2 depicts, the inlet structure includes an inner body 202 and an outer body 204. The outer body 204 is spaced apart from the inner body 202 to form an inlet flow path 203. The outer body 204 is coupled to the inner body via a plurality of hollow struts 206 (206-1, 206-2, 206-3, 206-4, 206-5) that extend across the inlet flow path 203. The struts 206 support the inner body 202 and the toroid-shaped tank 116 that is disposed within the inner body 202. The struts 206 may also support bearing compartments and other engine internal components, and may, in some embodiments, be used to pass lubricant and mechanical drive shafts to the engine 100 exterior.

No matter how the inlet structure 102 and the toroid-shaped tank 116 are specifically implemented, and as FIG. 1 also depicts, the engine 100 additionally includes a fluid level sensor 118. The fluid level sensor 118 is configured to sense the level of fluid (e.g., lubricant) within the toroid-shaped tank 116. One embodiment of the fluid level sensor 118, which is installed with the inlet structure 102 of FIG. 2, and that is used to measure the fluid level in the toroid-shaped tank 116 of FIG. 2, will now be described. Before doing so, it is noted that the fluid level sensor 118 may be used to measure the fluid level in various toroid-shaped tanks disposed in various machines and/or environments.

Figure 3:
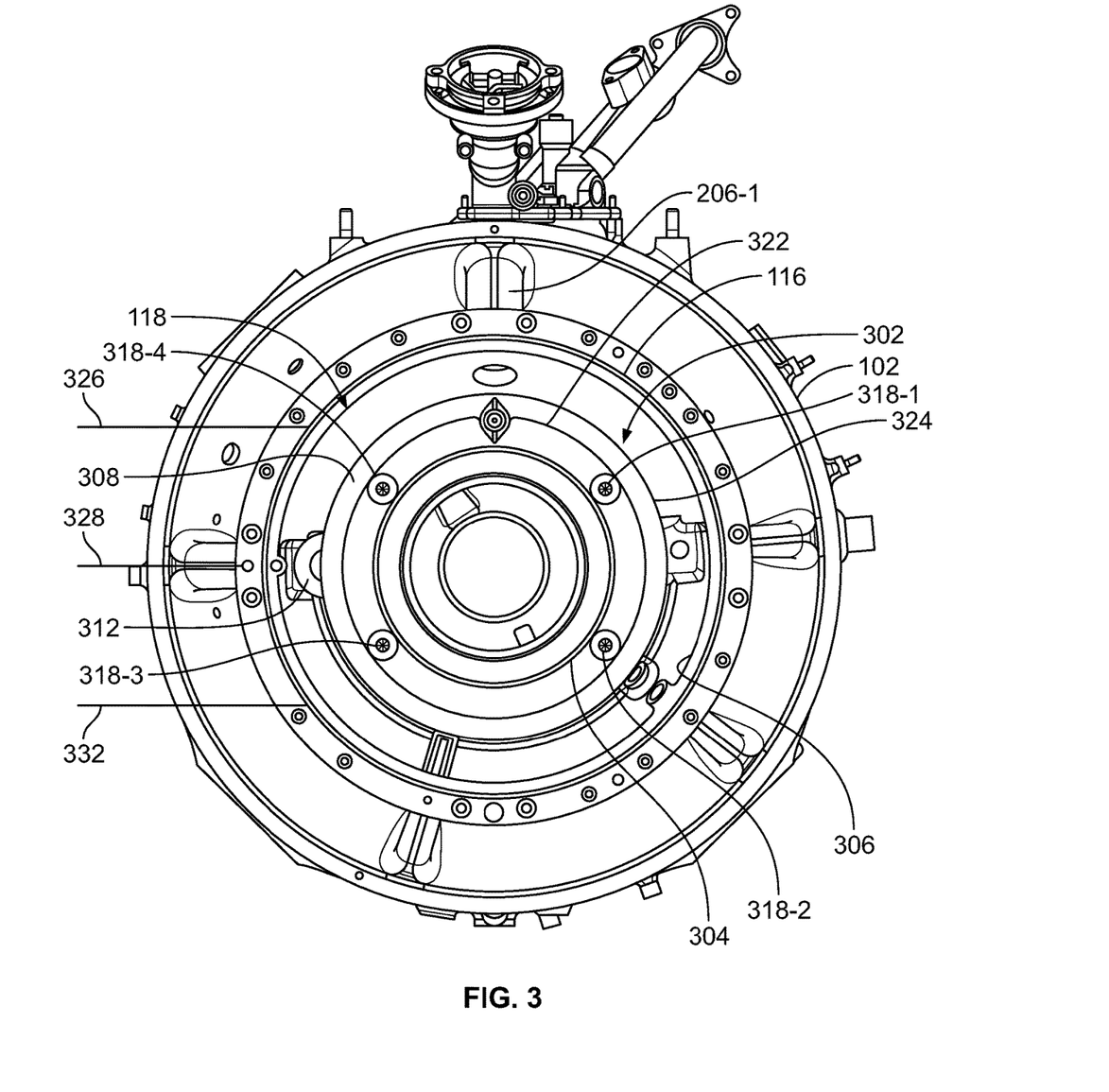
FIG. 3 depicts a front view of the inlet structure and toroid-shaped tank of FIG. 2 with a front cover portion of the toroid-shaped tank removed and showing various components of an embodiment of a fluid level sensor used to sense fluid level in the toroid-shaped tank.

Referring first to FIG. 3, a front view of the inlet structure 102 and toroid-shaped tank 116 is depicted, but with a front cover portion of the toroid-shaped tank 116 removed. Thus, as may be seen, the toroid-shaped tank 116 includes lubricant volume 302 defined between an innermost wall portion 304 and an outermost wall portion 306. Referring to FIGS.

Figure 4:
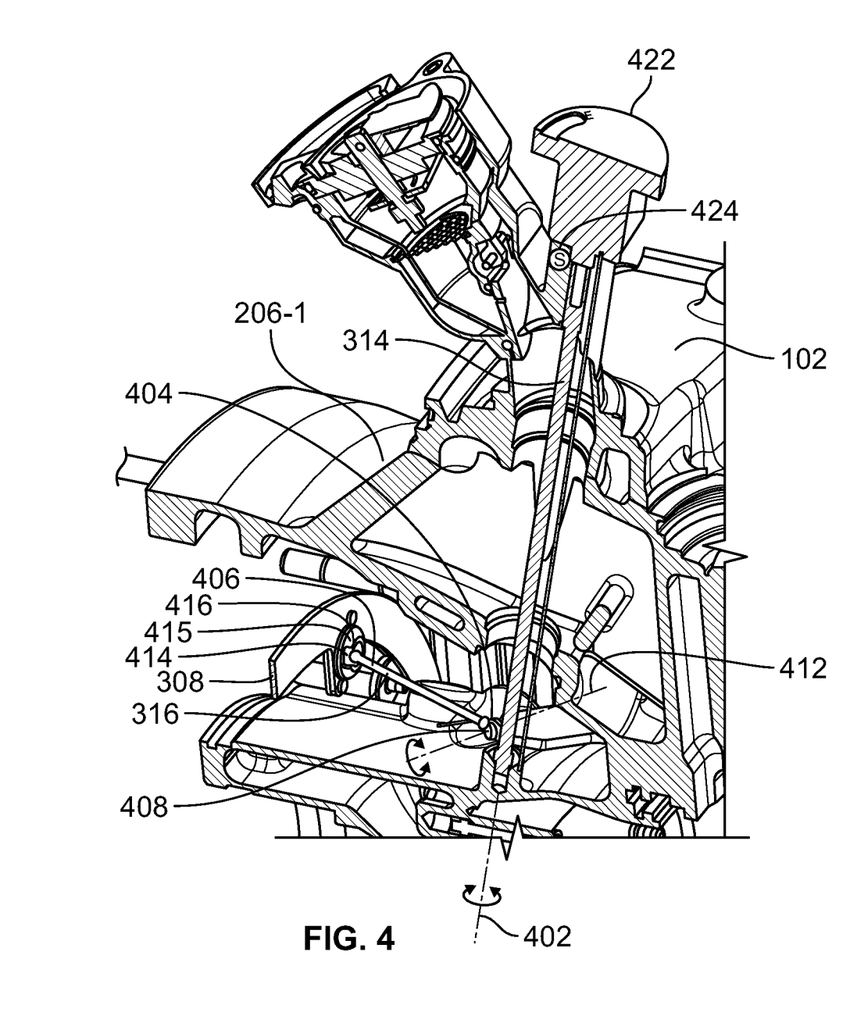
FIG. 4 depicts a cross section view of a portion the inlet structure, the toroid-shaped tank, and portions of the fluid level sensor.

3 and 4, it is seen that the depicted fluid level sensor 118 includes a float ring 308, a float structure 312, a gauge shaft 314, and a tiller arm 316.

The float ring 308 is mounted within the toroid-shaped tank 116 and is configured to rotate within the toroid-shaped tank 116 about the first rotational axis 112. To do so, at least in the depicted embodiment, the float ring 308 has a plurality of guide rollers 318 (e.g., 318-1, 318-2, 318-3, 318-4) coupled thereto. More specifically, the float ring 308 includes an inner peripheral surface 322 and an outer peripheral surface 324. Each guide roller 318 is coupled to the inner peripheral surface 322 and contacts the innermost wall portion 304 of the toroid-shaped tank 116. Although the depicted fluid level sensor 118 includes four guide rollers 318, it will be appreciated that it could be implemented with more or less than this number of guide rollers 318.

The float structure 312 is coupled to the float ring 308 and is configured to exhibit buoyancy in the lubricant (or other fluid) that is disposed within the toroid-shaped tank 116. As may be appreciated, the float structure 312 also needs to have sufficient mass to remain engaged with the lubricant (or other fluid) as the level drops (i.e., sufficiently heavy to overcome the friction in the system). The float structure 312 supplies a force to the float ring 308 based on the level of the lubricant (or other fluid) within the toroid-shaped tank 116, thereby causing the float ring 308 to rotate to a rotational position. As may be appreciated the rotational position to which the float ring 308 rotates, is dependent upon the level of the lubricant (or other fluid) within the toroid-shaped tank 116. It will additionally be appreciated that the float structure 312 may be made from any one of numerous suitable materials, which may depend, for example, on the fluid that is disposed in the toroid-shaped tank 116. Moreover, the float structure 312, which is generally cylindrically shaped in the depicted embodiment, may also be formed into any one of numerous other shapes.

As is shown most clearly in FIG. 4, the gauge shaft 314 is spaced-apart from the float ring 308 and is rotationally mounted on the inlet structure 102 in a manner that allows the gauge shaft 314 to rotate about a second rotational axis 402. The gauge shaft 314 is coupled to receive a rotational drive force from the tiller arm 316 and is configured, upon receipt of the rotational drive force, to rotate about the second rotational axis 402 to a position representative of the level of the lubricant (or other fluid) within the toroid-shaped tank 116. As FIGS. 3 and 4 also depict, the gauge shaft 314, at least in the depicted embodiment, extends through one of the hollow struts 206-1 that extend across the flow path 203 formed in the inlet structure 102.

With continued reference to FIG. 4, the tiller arm 316 has a first end 404 and a second end 406. The first end 404 is coupled to the gauge shaft 314, and the second end 406 extends through, and is axially movable relative to, the float ring 308. As such, the tiller arm 316 is configured to supply the rotational drive force to the gauge shaft 314 when the float ring 308 rotates. To do so, at least in the depicted embodiment, a pivot joint 408 is coupled between the first end 404 of the tiller arm 316 and the gauge shaft 314. The pivot joint 408, which may be variously implemented, is configured to allow the tiller arm 316 to rotate, relative to the gauge shaft 314, about a third rotational axis 412 that is perpendicular to the second rotational axis 402. Additionally, a spherical bearing 414 is mounted on, and is rotatable relative to, the float ring 308, via a suitable mount structure 415. The spherical bearing 414 has an opening 416 formed therethrough. The tiller arm 316 extends through the opening 416 and is axially movable relative to the spherical bearing 414.

As FIG. 4 also depicts, the fluid level sensor may additionally include a sight gauge housing 422. The sight gauge housing 422, when included, is mounted on the inlet structure 102, and at least a portion of the gauge shaft 314 is disposed within the sight gauge housing 422. The sight gauge housing 422, as shown most clearly in FIG. 5, has a sight gauge opening 502 formed therein through which the position of the gauge shaft 314 may be viewed. More specifically, a gauge pointer 504 is disposed within the sight gauge housing 422 and is visible via the sight gauge opening 502. The gauge pointer 504 is moved to a lubricant (or other fluid) level indicator position that corresponds to the position of the gauge shaft 314. Preferably, the sight gauge housing 422 is located such that, when the engine is installed, it is on top of the engine 100. This is so that, in twin engine applications, the engine oil level can be viewed by maintenance personnel from either the left or the right side.

Figure 5:
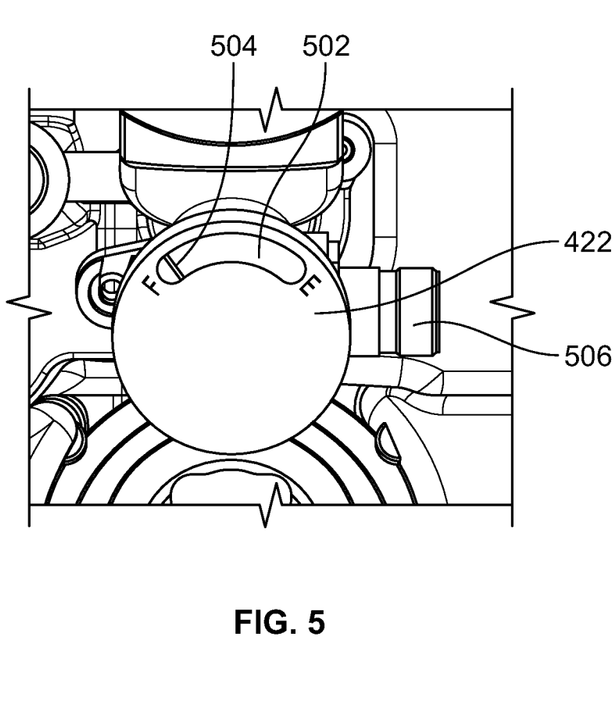
FIG. 5 depicts a top view of a sight gauge that may form part of the fluid level sensor.

As shown schematically in FIG. 4, the gauge shaft 314 may also, at least in some embodiments, be coupled to a rotational position sensor 424. The rotational position sensor 424, when included, is configured to sense the position of the gauge shaft 314 and supply a position signal indicative thereof. Although the rotational positions sensor 424 may be implemented using any one of numerous types of sensors, in one embodiment, the rotational position sensor 424 is implemented using a rotary variable differential transformer (RVDT). No matter the specific type of rotational position sensor that is used, and as FIG. 5 depicts, a signal connector 506 may be provided to allow power to be supplied to, and position signals to be retrieved from, the rotational position sensor 424.

Figure 6:
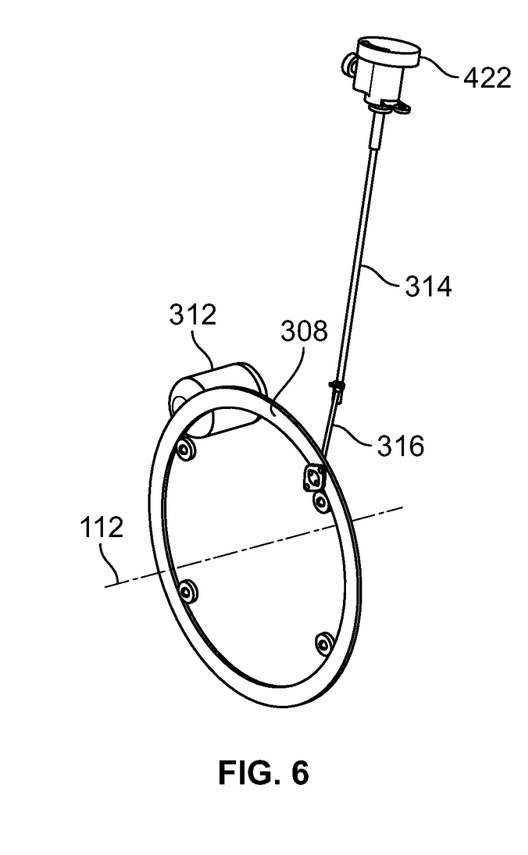
FIGS. 6-8 depict the fluid level sensor in positions that correspond to fluid levels of full, half-full, and empty, respectively.
Figure 7:
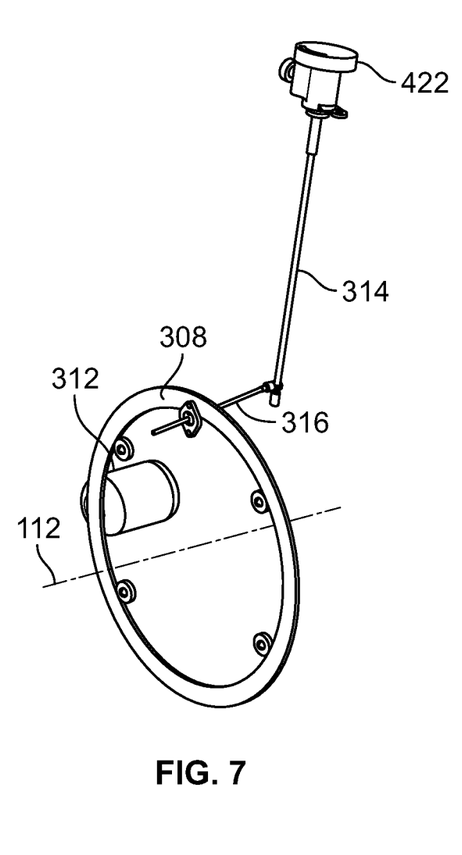
Figure 8:
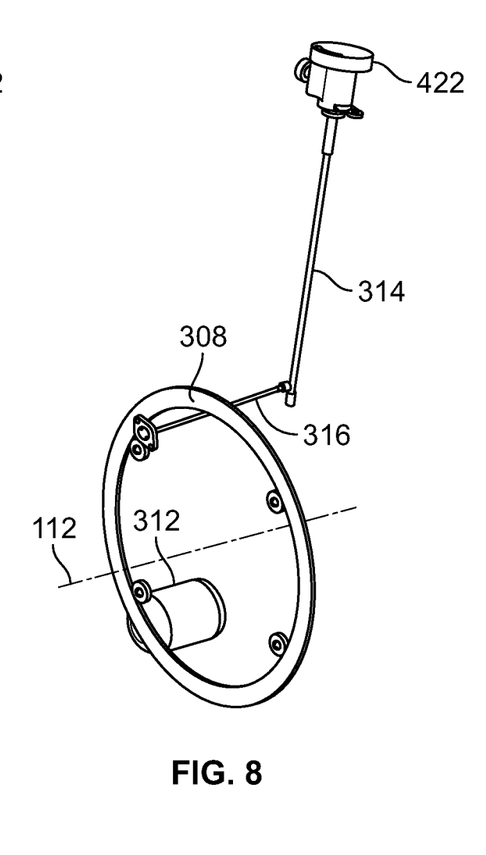

Turning now to FIGS. 6-8, the operation of the fluid level sensor 118 will now be described. It is noted that for clarity and ease of depiction, only the fluid level sensor 118 is shown. In FIG. 6, the fluid level sensor 118 is shown when the toroid-shaped tank 116 is at the full level 326 (see FIG. 3), in FIG. 7 it is shown when the toroid-shaped tank 116 is at the half-full level 328, and in FIG. 8 it is shown when the toroid-shaped tank 116 is at the empty level 332. As may be understood from FIGS. 6-8, the position of the float structure 312 varies with the level of the lubricant (or other fluid) within the toroid-shaped tank 116, which causes the float ring 308 to rotate around the first rotational axis 112. The rotation of the float ring 308 moves the tiller arm 316, which in turn rotates the gauge shaft 314 to a position that is representative of the lubricant (or other fluid) level in the toroid-shaped tank. These figures also clearly illustrate movement of the tiller arm 316 relative to the float ring 308 as the float ring 308 rotates. This, as noted above, is because the tiller arm 316 extends through the opening 416 in the spherical bearing 414.

The fluid level sensor 118 disclosed herein can measure the fluid level within a toroid-shaped tank 116 without having to dispose relatively complex and/or costly electronics on or within the tank. In the context of a gas turbine engine, the fluid level sensor allows for mechanically transmitting lubricant level to the outside of the engine through the struts in the engine inlet flow path.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A fluid level sensor for sensing a level of a fluid within a toroid-shaped tank, comprising:
   a float ring adapted to be mounted within the toroid-shaped tank and configured to rotate within the toroid-shaped tank about a first rotational axis;
   a float structure coupled to the float ring and configured to exhibit buoyancy in the fluid disposed within the toroid-shaped tank, the float structure supplying a force to the float ring based on the level of the fluid within the toroid-shaped tank, thereby causing the float ring to rotate;
   a gauge shaft spaced-apart from the float ring and mounted for rotation about a second rotational axis, the gauge shaft coupled to receive a rotational drive force and configured, upon receipt of the rotational drive force, to rotate about the second rotational axis to a position representative of the level of the fluid within the toroid-shaped tank; and
   a tiller arm having a first end and a second end, the first end coupled to the gauge shaft, the second end extending through the float ring and axially movable relative to the float ring, the tiller arm configured to supply the rotational drive force to the gauge shaft when the float ring rotates.

2. The fluid level sensor of claim 1, further comprising:
   a pivot joint coupled between the gauge shaft and the tiller arm, the pivot joint configured to allow the tiller arm to rotate, relative to the gauge shaft, about a third rotational axis that is perpendicular to the second rotational axis.

3. The fluid level sensor of claim 1, further comprising:
   a spherical bearing mounted on, and rotatable relative to, the float ring, the spherical bearing having an opening formed therethrough,
   wherein the tiller arm extends through the opening and is movable relative to the spherical bearing.

4. The fluid level sensor of claim 1, further:
   a sight gauge housing, within which at least a portion of the gauge shaft is disposed, the sight gauge housing having a sight gauge opening formed therein through which the position of the gauge shaft may be viewed.

5. The fluid level sensor of claim 4, further comprising:
   a gauge pointer disposed within the sight gauge housing and visible via the sight gauge opening, the gauge pointer moved to a fluid level indicator position that corresponds to the position of the gauge shaft.

6. The fluid level sensor of claim 1, further comprising:
   a rotational position sensor coupled to the gauge shaft, the rotational position sensor configured to sense the position of the gauge shaft and supply a position signal indicative thereof.

7. The fluid level sensor of claim 6, wherein the rotational position sensor comprises a rotary variable differential transformer (RVDT).

8. The fluid level sensor of claim 1, wherein:
   the float ring comprises an inner peripheral surface and an outer peripheral surface; and
   the fluid level sensor further comprises a plurality of guide rollers coupled to the inner peripheral surface, each of the guide rollers configured to contact a surface of the toroid-shaped tank.

9. An engine inlet assembly for a gas turbine engine, comprising:
   an inlet structure symmetrically formed about a first rotational axis, the inlet structure adapted to be coupled to a gas turbine engine;
   a toroid-shaped lubricant tank mounted within the inlet structure and symmetrically disposed about the first rotational axis; and
   a fluid level sensor configured to sense a level of lubricant within the toroid-shaped tank, the fluid level sensor comprising:
   a float ring mounted within the toroid-shaped tank and configured to rotate within the toroid-shaped tank about the first rotational axis;

a float structure coupled to the float ring and configured to exhibit buoyancy in the lubricant disposed within the toroid-shaped tank, the float structure supplying a force to the float ring based on the level of the lubricant within the toroid-shaped tank, thereby causing the float ring to rotate;

a gauge shaft spaced-apart from the float ring and rotationally mounted on the inlet structure in a manner that allows the gauge shaft to rotate about a second rotational axis, the gauge shaft coupled to receive a rotational drive force and configured, upon receipt of the rotational drive force, to rotate about the second rotational axis to a position representative of the level of the lubricant within the toroid-shaped tank; and a tiller arm having a first end and a second end, the first end coupled to the gauge shaft, the second end extending through the float ring and axially movable relative to the float ring, the tiller arm configured to supply the rotational drive force to the gauge shaft when the float ring rotates.

10. The engine inlet assembly of claim 9, wherein the fluid level sensor further comprises:

a pivot joint coupled between the gauge shaft and the tiller arm, the pivot joint configured to allow the tiller arm to rotate, relative to the gauge shaft, about a third rotational axis that is perpendicular to the second rotational axis.

11. The engine inlet assembly of claim 9, wherein the fluid level sensor further comprises:

a spherical bearing mounted on, and rotatable relative to, the float ring, the spherical bearing having an opening formed therethrough, wherein the tiller arm extends through the opening and is movable relative to the spherical bearing.

12. The engine inlet assembly of claim 9, wherein the fluid level sensor further comprises:

a sight gauge housing mounted on the inlet structure, wherein at least a portion of the gauge shaft is disposed within the sight gauge housing, the sight gauge housing having a sight gauge opening formed therein through which the position of the gauge shaft may be viewed.

13. The engine inlet assembly of claim 12, wherein the fluid level sensor further comprises:

a gauge pointer disposed within the sight gauge housing and visible via the sight gauge opening, the gauge pointer moved to a lubricant level indicator position that corresponds to the position of the gauge shaft.

14. The engine inlet assembly of claim 9, wherein the fluid level sensor further comprises:

a rotational position sensor coupled to the gauge shaft, the rotational position sensor configured to sense the position of the gauge shaft and supply a position signal indicative thereof.

15. The engine inlet assembly of claim 14, wherein the rotational position sensor comprises a rotary variable differential transformer (RVDT).

16. The engine inlet assembly of claim 9, wherein:

the toroid-shaped tank includes lubricant volume defined between an innermost wall portion and an outermost wall portion;

the float ring comprises an inner peripheral surface and an outer peripheral surface; and the fluid level sensor further comprises a plurality of guide rollers coupled to the inner peripheral surface, each of the guide rollers contacting the innermost wall portion of the toroid-shaped tank.

17. A gas turbine engine assembly, comprising:

a housing;

a compressor, a combustor, and a turbine disposed within the housing, the turbine and compressor mounted to rotate about an a first rotational axis;

an inlet structure coupled to the housing upstream of the compressor, the inlet structure symmetrically disposed about the first rotational axis;

a toroid-shaped lubricant tank mounted within the inlet structure and symmetrically disposed about the first rotational axis; and a fluid level sensor configured to sense a level of lubricant within the toroid-shaped tank, the fluid level sensor comprising:

a float ring mounted within the toroid-shaped tank and configured to rotate within the toroid-shaped tank about the first rotational axis;

a float structure coupled to the float ring and configured to exhibit buoyancy in the lubricant disposed within the toroid-shaped tank, the float structure supplying a force to the float ring based on the level of the lubricant within the toroid-shaped tank, thereby causing the float ring to rotate;

a gauge shaft spaced-apart from the float ring and rotationally mounted on the inlet structure in a manner that allows the gauge shaft to rotate about a second rotational axis, the gauge shaft coupled to receive a rotational drive force and configured, upon receipt of the rotational drive force, to rotate about the second rotational axis to a position representative of the level of the lubricant within the toroid-shaped tank; and a tiller arm having a first end and a second end, the first end coupled to the gauge shaft, the second end extending through the float ring and axially movable relative to the float ring, the tiller arm configured to supply the rotational drive force to the gauge shaft when the float ring rotates.

18. The gas turbine engine assembly of claim 17, wherein the fluid level sensor further comprises:

a pivot joint coupled between the gauge shaft and the tiller arm, the pivot joint configured to allow the tiller arm to rotate, relative to the gauge shaft, about a third rotational axis that is perpendicular to the second rotational axis; and a spherical bearing mounted on, and rotatable relative to, the float ring, the spherical bearing having an opening formed therethrough, wherein the tiller arm extends through the opening and is movable relative to the spherical bearing.

19. The gas turbine engine assembly of claim 17, wherein the fluid level sensor further comprises:

a sight gauge housing mounted on the inlet structure, wherein at least a portion of the gauge shaft is disposed within the sight gauge housing, the sight gauge housing having a sight gauge opening formed therein through which the position of the gauge shaft may be viewed; and a gauge pointer disposed within the sight gauge housing and visible via the sight gauge opening, the gauge pointer moved to a lubricant level indicator position that corresponds to the position of the gauge shaft.

20. The gas turbine engine assembly of claim 17, wherein the fluid level sensor further comprises:

a rotational position sensor coupled to the gauge shaft, the rotational position sensor configured to sense the position of the gauge shaft and supply a position signal indicative thereof.

* * * * *